Patented May 24, 1932

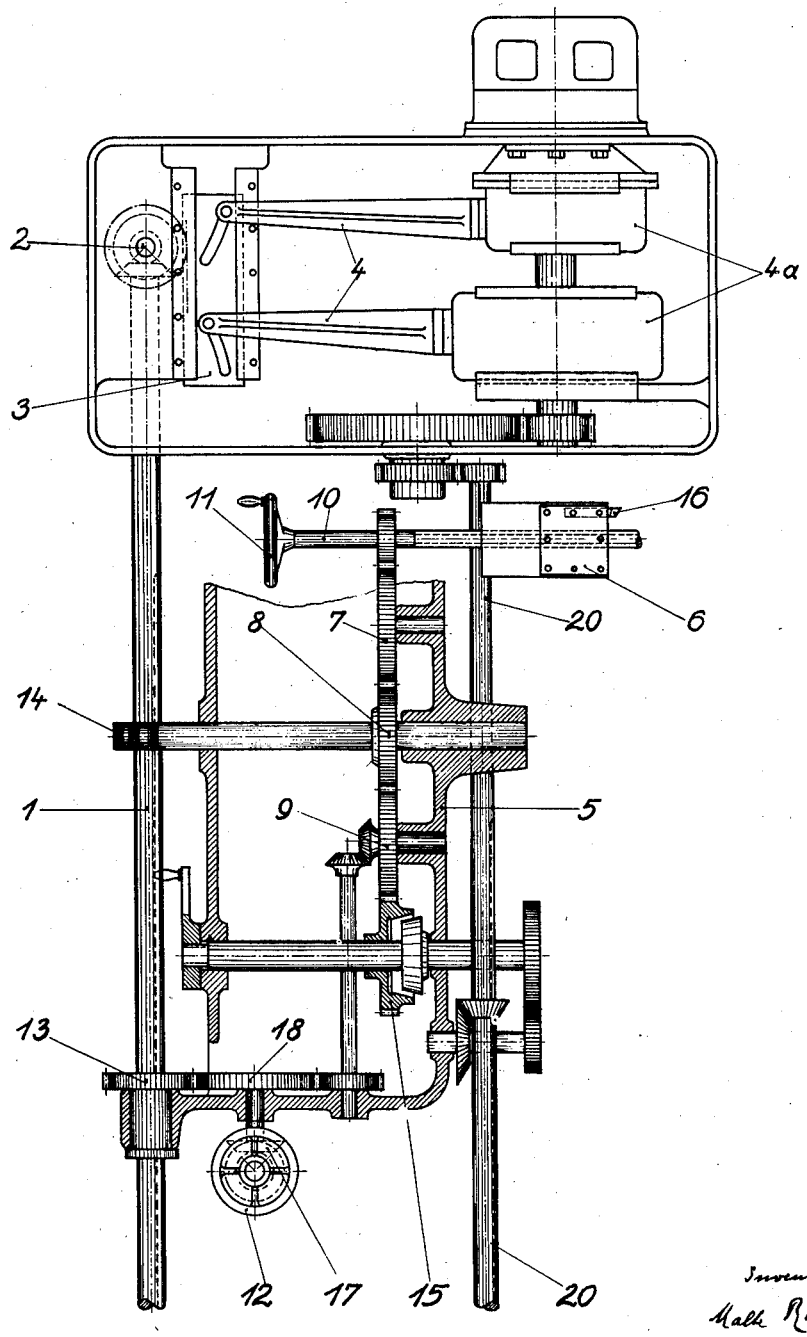

1,859,715

UNITED STATES PATENT OFFICE

MALTE RITTER, OF MAGDEBURG, GERMANY, ASSIGNOR TO MAGDEBURGER WERK-ZEUGMASCHINENFABRIK AKTIENGESELLSCHAFT, OF MAGDEBURG, GERMANY

ARRANGEMENT ON LATHES AND OTHER MACHINE TOOLS WITH DRIVE BY HYDRAULIC STEPLESS GEARINGS

Application filed May 20, 1930, Serial No. 454,116, and in Germany April 24, 1930.

In machine tools, which were driven by a hydraulic gearing, the adjustment of the speeds was effected by displacing the hand wheel, arranged on the oil gearing. According to the invention, however, the machine tool can be so arranged, that the adjustment of the oil gearing can be effected from the operator's stand, that is from the carriage of the machine tool. A shaft, connected with the control of the oil gearing, must then be provided in the longitudinal direction of the machine tool, for example of the lathe, which shaft is in turn connected with a hand wheel mounted on the carriage.

For adjusting the oil gearing however, the spindle of the transverse slide, which is provided with a hand wheel, can be used, in that this spindle is connected by suitable transmission wheels with an adjusting device for the hydraulic gearing. Finally the automatic facing cut of a lathe can also be connected with the regulating device of the liquid gearing.

An embodiment of the invention is illustrated by way of example in the only figure of the accompanying drawing, which shows a section through the gear box of the carriage of a machine tool.

On the bed of the machine tool a shaft 1 is journaled, which is connected by a shaft 2 to the adjusting bar 3 engaging in the adjusting devices 4 of the liquid gearing 4a composed of a pump and a motor. On the apron 5 of the carriage intermediate wheels 7, 8 and 9 are mounted. The wheel 7 engages with the facing cut spindle 10, adapted to be displaced by a hand wheel 11. Moreover on the carriage apron a hand wheel 12 is arranged, which actuates through the transmission wheels 17 and 18, the wheel 13, which is slidable on the shaft 1 and rotates with this shaft. The wheel 8 can be disengaged by a handle 14. The wheel 15 is connected with the automatic face cutting gearing.

The operation is as follows:

By actuating the hand wheel 12 the liquid gearing and therefore the working speed of the machine tool can be regulated from the operator's stand. The wheel 8 is disengaged. If this wheel is disengaged, for example when face cutting with the carriage, the cutting tool 16 is displaced by rotating the hand wheel 11, and therefore at the same time the liquid gear is regulated through the intermediate wheels and the shaft 1 in such a manner, that the cutting speed, which has been set, remains constant. In like manner, when the automatic facing cut is engaged, a positive adjustment of the rotating speed of the blank is obtained according to the distance of the tool from the centre of the blank and also in this instance the cutting speed remains constant.

The arrangement above described possesses the further advantage that, when changing from facing cut to turning cut, the correct speed of rotation is automatically available for the adjusted diameter of the tool on the blank, because the rotating speed of the blank is in a direct relation to the adjusted diameter through the controlling of the oil gear.

I claim:—

1. An arrangement on lathes and other machine tools with drive by hydraulic stepless gearing, comprising in combination a common adjusting element for said gearing, a plurality of intermediate elements between said adjusting element and said gearing, one of said intermediate elements adapted to be disengaged, an arrangement for face cutting connected to said adjusting element, and an arrangement for adjusting said hydraulic gearing independently of the position of the tool.

2. An arrangement as specified in claim 1, in which the intermediate elements are an automatic facing cut, and a toothed wheel of said automatic facing cut meshing with said intermediate element.

In testimony whereof I affix my signature.

MALTE RITTER.